May 10, 1927.
L. N. BRILLOUIN ET AL
1,627,767
TRANSMISSION BY ELECTRIC OSCILLATIONS
Filed Aug. 10, 1925     10 Sheets-Sheet 1
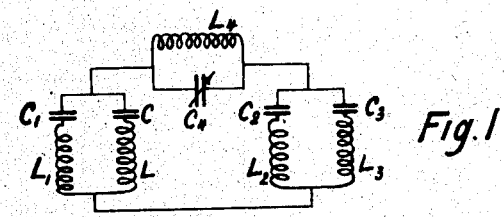
Fig.1
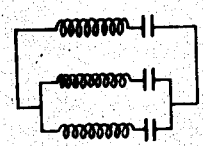
Fig.2
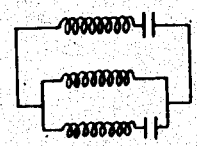
Fig.3
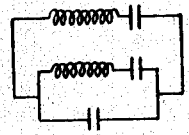
Fig.4
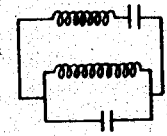
Fig.5
Fig. 6
Fig. 7
Fig. 8
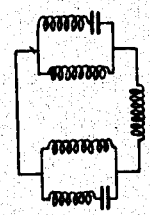
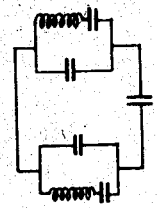
Fig. 9
Fig. 10
Fig. 11
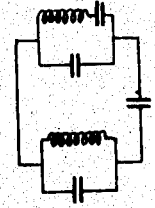
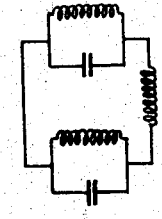
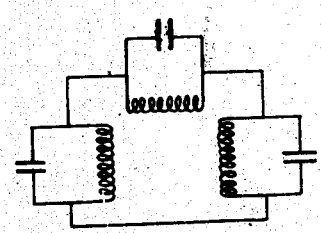
Fig.12
Inventors
L.N. Brillouin
E.M.F. Fromy
by Langner, Parry,
Card & Langner
Attys.

May 10, 1927.
L. N. BRILLOUIN ET AL
1,627,767
TRANSMISSION BY ELECTRIC OSCILLATIONS
Filed Aug. 10, 1925  10 Sheets-Sheet 2
Fig.13  Fig.14  Fig.15
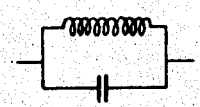 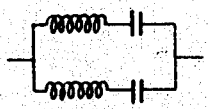 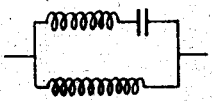
Fig.16
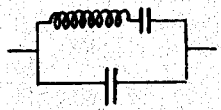
Fig.17
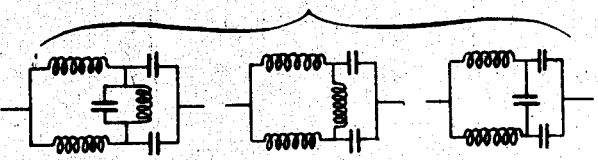
Fig.18  Fig.19  Fig.20  Fig.21
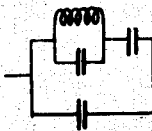 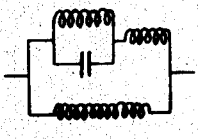 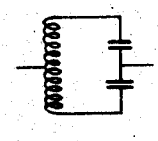 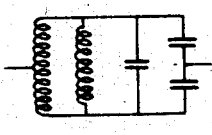
Inventors
L. N. Brillouin
E. M. F. Fromy
by Langner, Parry, Card + Langner
Attys May 10, 1927.  L. N. BRILLOUIN ET AL  1,627,767
TRANSMISSION BY ELECTRIC OSCILLATIONS
Filed Aug. 10, 1925   10 Sheets-Sheet 3

Inventors.
L.N.Brillouin
E.M.F.Fromy
by Langner, Parry, Card & Langner
Attys.

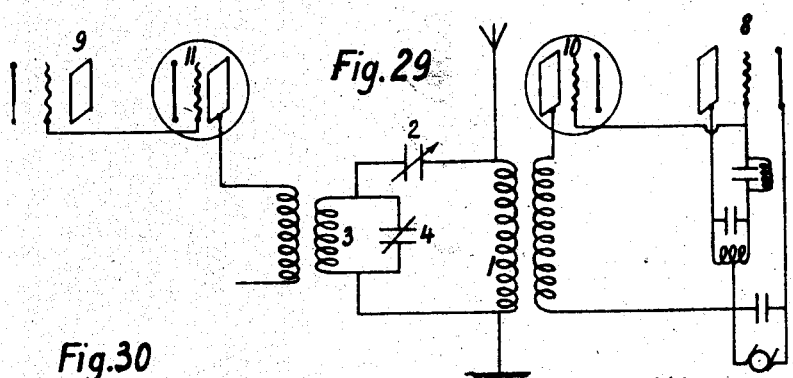
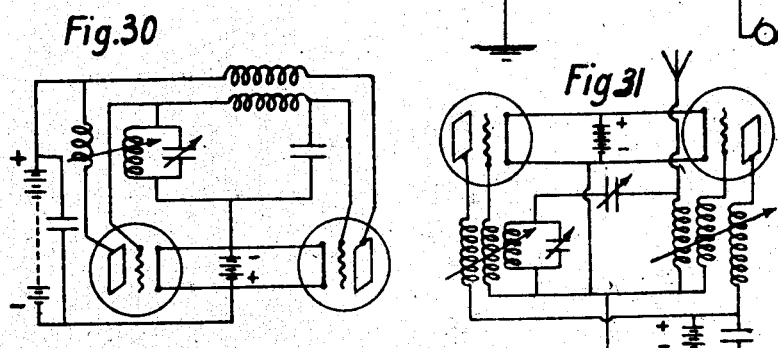
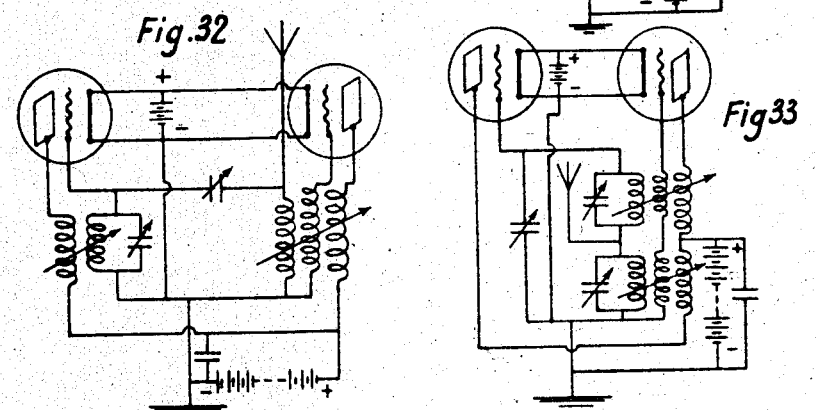
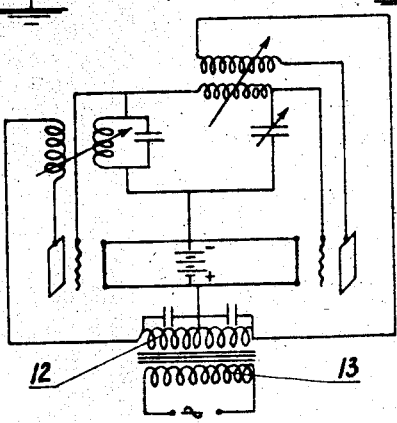

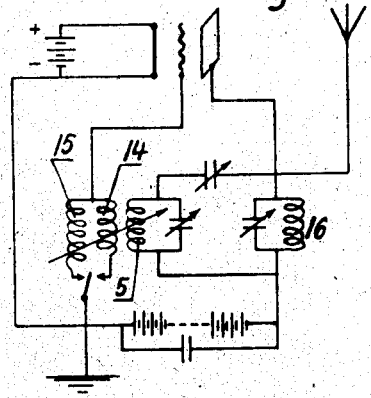
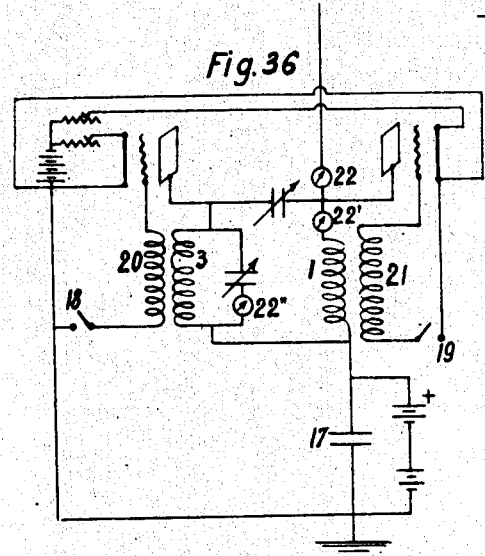
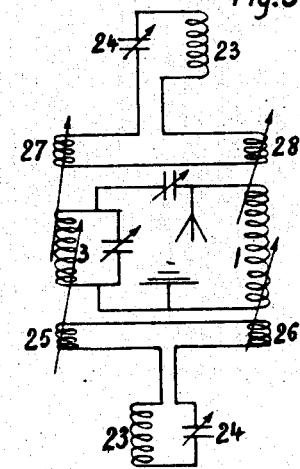
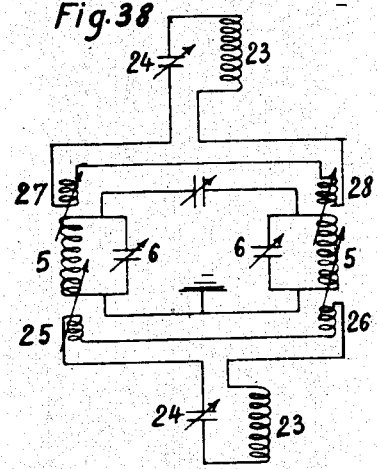
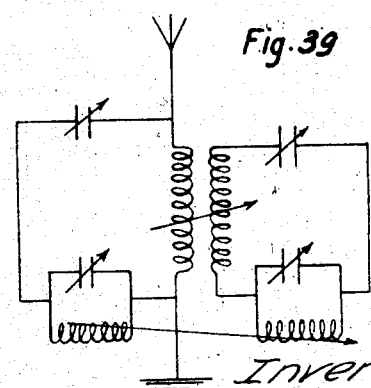

May 10, 1927.

L. N. BRILLOUIN ET AL 1,627,767

TRANSMISSION BY ELECTRIC OSCILLATIONS

Filed Aug. 10, 1925     10 Sheets-Sheet 8

Inventors
L. N. Brillouin
E. M. F. Fromy
by Langner, Parry, Card & Langner
Attys May 10, 1927.  L. N. BRILLOUIN ET AL  1,627,767
TRANSMISSION BY ELECTRIC OSCILLATIONS
Filed Aug. 10, 1925    10 Sheets-Sheet 9
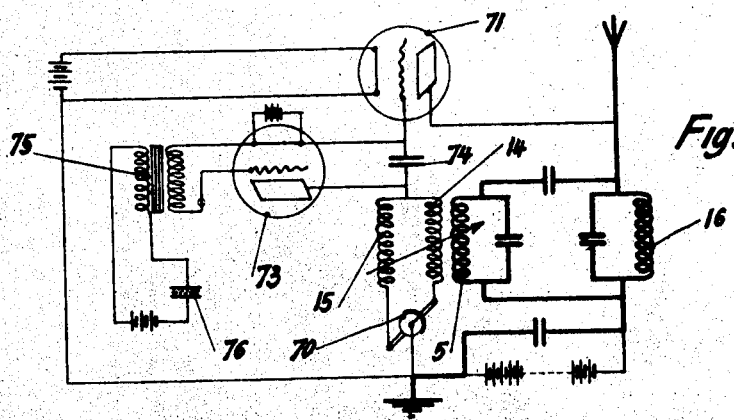
Fig. 44
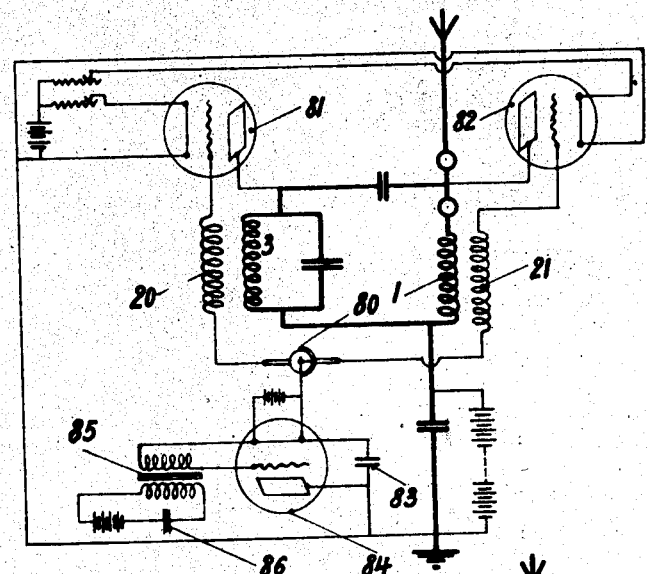
Fig. 46
Fig. 45
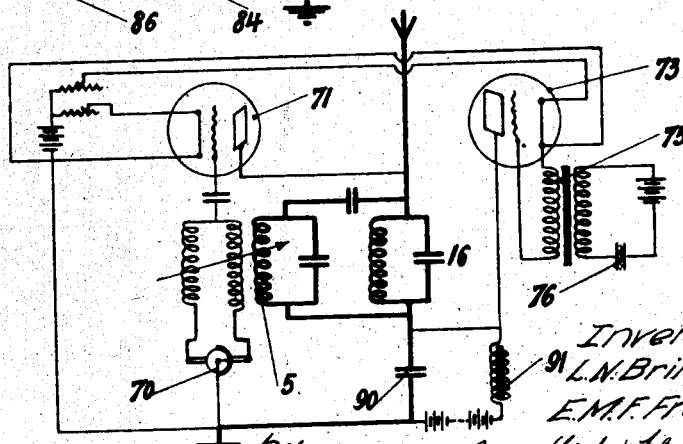
Inventors
L. N. Brillouin
E. M. F. Fromy
by Langner, Parry, Card & Langner
Attys.

May 10, 1927.  
L. N. BRILLOUIN ET AL  
1,627,767
TRANSMISSION BY ELECTRIC OSCILLATIONS
Filed Aug. 10, 1925     10 Sheets-Sheet 10
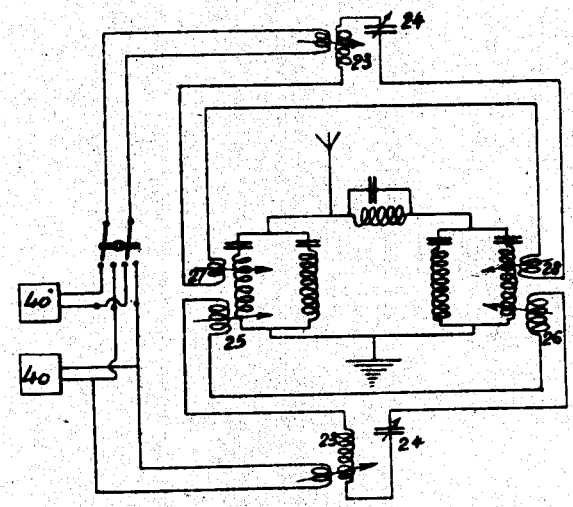
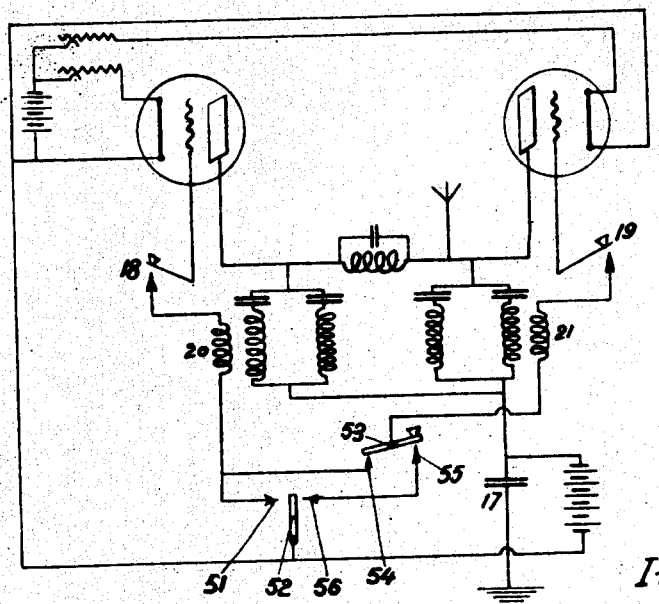
Fig. 48
Inventors:
L. N. Brillouin &
E. M. F. Fromy.
By Langner, Parry, Card & Langner
Attys.

Patented May 10, 1927.

1,627,767

UNITED STATES PATENT OFFICE.

LÉON NICOLAS BRILLOUIN AND EMILE MARIE FRANÇOIS FROMY, OF PARIS, FRANCE.

TRANSMISSION BY ELECTRIC OSCILLATIONS.

Application filed August 10, 1925, Serial No. 49,394, and in France November 10, 1924.

Our invention relates to compound circuits oscillating on a plurality of wavelengths which can be predetermined by choosing suitably the electric characteristics of the parts composing the circuits. These can be used with advantage as described hereinafter for transmission by electric oscillations, telephonic or telegraphic, with or without wire.

Our invention has chiefly for object the means for connecting such circuits in transmission stations with the antenna, one or more wave lengths being used simultaneously for the transmission. We describe more particularly a transmission borne simultaneously by two waves in the same or opposite directions, devices for protecting the transmission against strays whether these be intentional or accidental and arrangements for secret communication.

The appended drawings will help the invention to be better understood.

Fig. 1 is a diagram of a compound circuit of the most general type.

Figs. 2 to 21 are diagrams of several compound oscillating circuits deriving from the one shown on Fig. 1.

Figs. 29 to 33 relate to radio communication stations using compound circuits oscillating on several wave-lengths.

Figs. 34, 35 and 36 show the connections used in stations emitting two waves alternately.

Figs. 37, 38 and 39 show the connections used in stations receiving the two waves.

Figure 40:
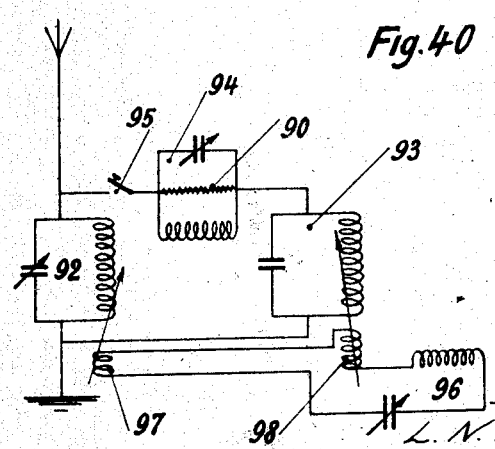
Figure 41:
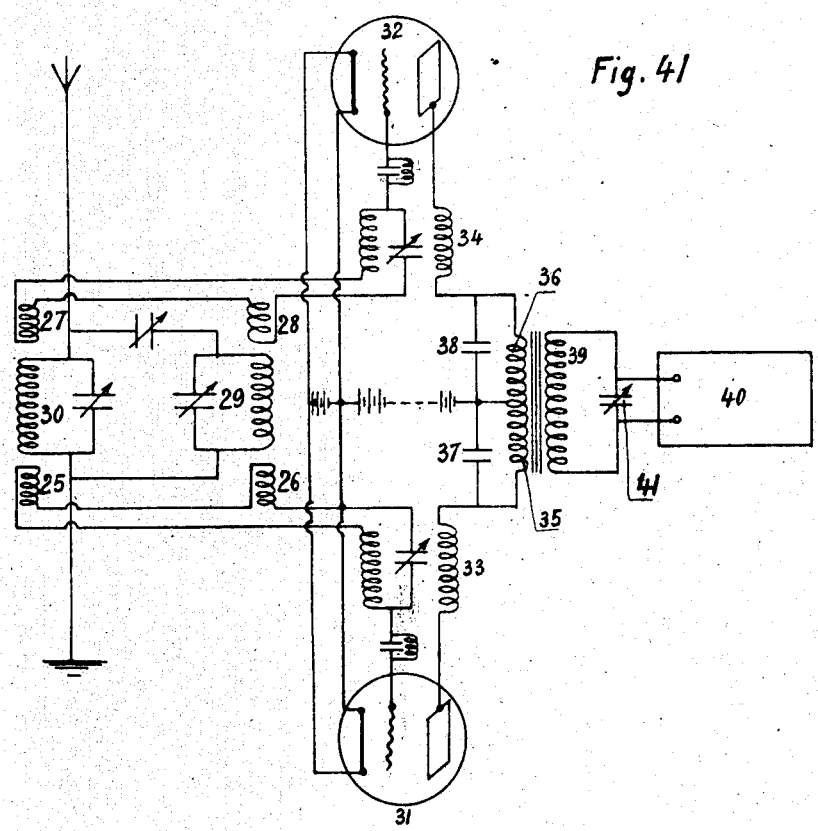

Figs. 40 and 41 show the connections used for preventing the reception being confused by another station.

Figures 42 to 48 relate to arrangements for secret communication.

Figure 1 shows the most general type of compound circuits oscillating on several wave lengths. It comprises three secondary circuits which we shall henceforward term plug circuits. By suppressing certain elements of these circuits simpler compound circuits can be obtained oscillating only on two wave-lengths. These simpler circuits can be grouped in three classes according to the number of plug circuits used.

Class 1. Circuits comprising a coil and a condenser in series with a compound, semi-compound or simple plug circuit (Figs. 2 to 5) and which can be obtained by suppressing from the general circuit of Fig. 1 $L_1$, $C_1$ and the plug circuit $L_4$ $C_4$ and by simplifying according to the case, the plug circuit $C_2$ $C_3$ $L_2$ $L_3$.

Class 2. Circuits comprising a coil or a condenser in series with two semi-compound or simple plug circuits (Figs. 6 to 11). These circuits can be obtained by suppressing from the general circuit $L_4$, $C_4$ and by simplifying one after the other the two plug circuits $L$ $C$ $L_1$ $C_1$ and $L_2$ $C_2$ $L_3$ $C_3$.

Class 3. Circuits comprising three simple plug circuits (Fig. 12) which are obtained by suppressing from the general circuit $L_1$ $C_1$, $L_2$ and $C_3$.

The diagrams drawn are not the only possible ones. It is sufficient to replace one or more of the secondary plug circuits by equivalent circuits oscillating on one wave only.

By way of example the three plug circuits of Fig. 17 which are equivalent to the compound plug circuit of Fig. 14 and the plug circuits of Figs. 18 and 19 which are respectively equivalent to the semi-compound plug circuits of Figs. 15 and 16 are shown.

It is easy to see that comparatively intricate circuits such as those of Figs. 17 to 19 are equivalent to less intricate ones, such as those shown on Figs. 13 to 16. For instance the compound plug circuit of Fig. 14 can be diagrammatized as on Fig. 20 which makes it appear as a simple plug circuit connected through the centers of the coil and of the condenser. Evidently without changing its properties it can be provided with either a shunted coil or a shunted condenser (Fig. 17) or with both (Fig. 21).

In a similar manner if a coil or a condenser is taken out of the compound circuit of Fig. 20 and said circuit becomes thus a semi-compound plug circuit, the diagrams of Figs. 18 and 19 are obtained.

If the plug circuits (Figs. 13 to 21) are inserted in lieu of the equivalent plug circuits of the eleven circuits shown on Figs. 2 to 12 a great number of new compound circuits would be obtained diagrams of which could be drawn easily.

To make up antennæ vibrating with two wave-lengths by using these compound circuits it is only necessary to replace by a derivation connecting an antenna to earth, either a capacity in case a short antenna is used, which acts very much like a capacity (this antenna could be also connected in parallel with the capacity) or a coil connected in series with a capacity in case a long antenna is used wave length of which is near that of one of the waves used.

Thus a great number of antennæ having two wave lengths can be made up diagrams of which can be easily drawn by using the eleven diagrams of compound circuits (Figs. 2 to 12). By way of example Figures 22 to 28 show some forms of execution of such two-wave antennæ.

Figures 22, 23, 24 and 25 show two-wave antenna circuits produced with short antennæ connected with the circuits of Figures 2, 6, 9 and 11.

Figure 26:
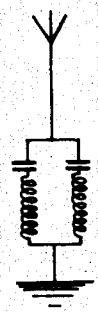
Figure 27:
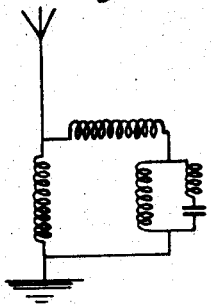
Figure 28:
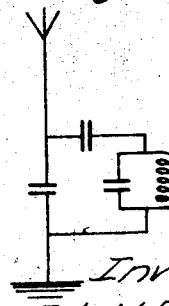

Figures 26, 27 and 28 show two wave antenna circuits produced with long antennæ connected with the circuits of Figures 2, 6 and 7. The parts of these antenna circuits are shown as stationary on the above-mentioned figures but of course they can be made adjustable so as to allow the adjustment of the antenna on two given wave lengths.

For coupling these circuits the following directions should be heeded.

With the circuits of class 1 (Figs. 2 to 5) used in practice for two waves having a great difference between their wave-lengths the two waves oscillate separately one in the plug circuit and the other in the derivation and generally the shorter one oscillates in the former and the longer in the latter.

The current and the voltage in the plug circuit will then be great for the shorter wave, the voltage being small for the current corresponding to the longer wave. On the contrary in the derivation, the current and the voltage at the terminals of the condenser will be small for the shorter and great for the longer wave.

The voltage between the terminals of the coil will be great for the currents corresponding to both waves. The direction of the current in the coils of the plug circuit and of the derivation is the same or not according to the wave to which said current corresponds.

In the circuit of class 2 (Figs. 6 to 11) and of class 3 (Fig. 12) which can be used for waves of near wave-lengths the separation between the waves is not as absolute. However if the two plug circuits (Class 2) or two of the plug circuits (class 3) are tuned to the same frequency one of the waves oscillates in these two plug circuits, no current passing through the connecting coil, condenser or plug circuit and no voltage difference existing between the terminals of said connecting device. The currents in the coils of the two plug circuit have relative directions which differ according to the wave which makes them oscillate.

Consequently for coupling the circuits of class 2 and class 3 the connections can be made at the terminals of the principal plug circuits if both waves are to be emitted or received, or else at the terminals of the connecting coil, condenser or plug circuit, if the wave oscillating in the plug circuits is to be eliminated so as to allow the reception or emission of the other.

Magnetic couplings can also be used either through a coil coupled inductively with the connecting coil or condenser when the wave oscillating in the plug circuits is to be eliminated or else through two coils inserted in series and coupled inductively with the coils of the two plug circuits. If these couplings have suitable values it is easy as hereinabove to receive or emit simultaneously both waves or only one, the other being completely eliminated.

An emitting station can be easily set up with connections embodying the above-disclosed principles. Figs. 29 to 36 show by way of example a number of such emitting stations using two-wave circuits. Some use the diagram of Fig. 5 and are adapted for emitting two wave-lengths comparatively different one from the other (the ratio of the wave-lengths not being less than 2). The others using the diagram of Fig. 11 are adapted for emitting comparatively near wave-lengths.

(A) *Simultaneous emissions.*

Fig. 29 shows in a general and diagrammatical manner an emitting station antenna of which vibrates through induction.

Figure 22:
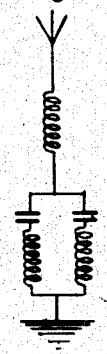
Figs. 22 to 28 show several ways of coupling such circuits with an antenna.
Figure 23:
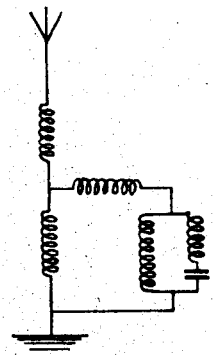
Figure 24:
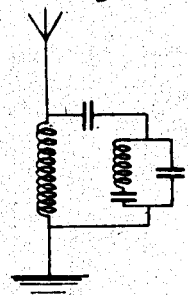
Figure 25:
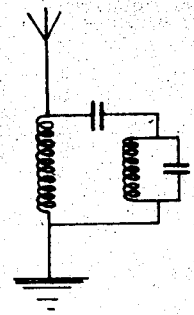

Two autodyne circuits fed by the vacuum tubes 8 and 9 and each adjusted for one of the wave-lengths emitted are connected with the grids of the two coupling tubes 10 and 11; latter comprise in their plate circuit coils each coupled with the corresponding coil 1 or 3 of the antenna circuit similar to that shown on Fig. 23. When not widely different wave-lengths are used the coils of the plate circuits would be coupled with the coils of plug circuits connected with the antenna.

Figures 30, 31, 32 and 33 show several connections where only two vacuum tubes are needed. The connections as on Figure 30 cannot be used with an antenna as it would oblige a grid to be connected with earth; on the contrary Figures 31 and 32 show connections which may be used with an antenna as does also Figure 33 which is specially adapted for use with wave-lengths not widely different.

The connections of Fig. 30 afford a very good selection between the two waves whereas those of Figures 31, 32 and 33, if no special care is taken afford only an approximate selection, the two waves influencing each other.

This interference can be avoided if the change of the direction of the current in the two coils of the antenna according to the wave emitted is made use of. It is sufficient to couple the antenna coils with two plate coils mounted in series in such a manner as to make the currents produced by one wave flow in the same direction, whereas those produced by the other will flow in opposite directions and annul each other. By these means each valve can be protected from the wave which it does not produce and is not influenced thereby.

(B) Alternate emissions.

These can be made with two audions (or groups of audions) which are set oscillating one after the other, either by feeding the plates with alternating potentials phases of which are in opposition, as shown on Fig. 34. The primary 13 of a transformer is fed with A. C. and its secondary is inserted between the two plates of which each works only during the half period of the feeding current when it is positive with reference to the corresponding filament.

It is easy to understand without any further explanation nor drawing that a similar device can be provided for by a ticker which will set the tubes working alternately by opening and closing alternately the circuits allowing the said tubes to work.

Fig. 35 shows how the two alternating waves can be produced by only one audion (or set of audions in parallel) with a ticker connecting the grid with either the coil 14 or the coil 15. These coils are made up in a manner such as will give the waves produced in the antenna circuit the chosen wave-lengths according to the coil (14 or 15) which is inserted in the circuit. It should be noted that for a same direction of flow of the current in the coil 15 the current flows through coil 5 in one direction or the other according as to whether the longer or the shorter of the two wave-lengths is used. The coils 14 and 15 should therefore be wound in opposite directions so that either one or the other wave can pass according to the position of the ticker.

All the devices described hereinbefore and working with either a transformer or a ticker can be used with modulated waves emitted simultaneously or alternatively at any frequency, the frequencies being equal or not. However in the case of powerful stations the connections shown on Figures 30 to 33 have the following drawbacks.

1°. The switching open of circuits wherethrough flow comparatively strong currents;

2°. The cutting of connections at points under voltage which necessitates special care for the insulation of the ticker and of its feeding batteries. These drawbacks can be avoided by using the connections shown on Figure 36 which can serve for many arrangements.

On Figure 36 given by way of example, the compound circuit shown is the one adapted for comparatively different wave lengths; a large condenser 17 is inserted at the foot of the antenna to separate it from the ground. The antenna circuit is connected with the grids of the two tubes by means of the coils 20 and 21 coupled respectively with the coils 1 and 3, latter coils being inserted in the plate circuits. Two switches 18 and 19 are provided between the grids and the filaments of the tubes.

If these switches are operated alternately so that one is open when the other is shut and shut when the other is open the two waves will be emitted alternately. For this purpose it is sufficient to replace the two switches 18 and 19 by a ticker with two contact pieces each connected with one of the grids, the body of the ticker being grounded.

The drawbacks pointed out hereinabove are avoided as it is the grid circuits which are opened and closed and through these grid circuits only very small currents pass. The ticker being grounded the points where the circuits are cut are at no high voltage.

These connections allow different arrangements to be provided for instance.

(a.) By closing the two switches, two undamped waves will be emitted simultaneously;

(b.) By closing one switch and opening the other, only one undamped wave is emitted.

(c.) By replacing the switches or one of these by a ticker the corresponding wave can be modulated to the rythm of the beats of the ticker, thereby allowing:

The emission of one modulated wave;

The emission of two waves modulated at different frequencies;

The emission of a modulated waved and of an undamped one.

(d.) By using one ticker opening and closing simultaneously or alternately the two circuits, two waves may be emitted together or in alternation which are modulated at the same frequency.

On Fig. 36 are shown three ammeters 22, 22′ and 22″. The ammeter 22 gives the current produced in the antenna by the sum of the two waves whereas the ammeters 22′ and 22″ give the current corresponding to each separate wave.

The corresponding receiving station is provided with an antenna of one of the above described types. The Figures 37, 38 and 39 show by way of example connections which may be used.

(a.) The connections shown on Figures 37 and 38 first of which relates to waves of comparatively different wave-lengths and the second to waves of not widely different wave-lengths, comprise two circuits; each of these is an oscillating suitably tuned circuit comprising a coil 23 and a condenser 24 and is coupled with the coils 1 and 3 (Fig. 37) or with the coils 5 (Fig. 38) of the antenna circuit through its coils 25, 26 or 27, 28. The oscillating circuit is coupled or connected on the other hand with an amplifier (not shown); as stated hereinabove the current flows through the coils 1 and 3 or through the two coils 5 in the same or in opposite directions according as to whether it is produced by the shortest or the longest wave. Therefore the coils 25 and 26 for instance should be wound in the same direction and the coils 27 and 28 in opposite directions. In one of the oscillating circuits comprising one of these groups of coils the currents produced by one of the waves will be added and those produced by the other will be in opposition; thus by suitable adjustments the effects of one of the waves can be annihilated in each circuit, and two absolutely independent receivers will be provided for.

(b.) In the diagram shown on Figure 39 the secondary comprises a two-wave circuit of one of the abovedescribed types which acts upon amplifiers (not shown). With such a diagram the corresponding coils must be coupled together; the coupling may be besides be replaced by a direct connection.

The preceding descriptions of receiving or emitting stations are sufficient, without any longer explanations and without any further diagrams, to make clear the execution of radio-telephonic stations emitting on one wavelength and receiving on another whereby a conversation is possible like on an ordinary wire circuit.

Three forms of execution of a device for protection against strays whether intentionally emitted by another station or not are described hereinbelow.

(A.) The transmission is operated on two simultaneous waves of greatly different frequencies. The reception is such as will comprise two receivers each of which is influenced by only one of the two waves, the other wave having no effect upon the receiver considered. Thus if one of the waves is confused it will always be possible to receive on the other.

(B.) The transmission is operated on one wave only whereby the stray wave can be eliminated even if it has a very near wavelength.

In this case compound circuits of the groups 2 and 3 should be used.

By way of example Fig. 40 shows a receiver of this type. The antenna is small and can vibrate for two wave-lengths not widely different. The antenna circuit is of the type shown on Fig. 12. This circuit comprises three plug circuits 92—93 and 94. One of these, 92 is inserted in the antenna. A switch 95 allows the plug circuits 93 and 94 to be cut off the main circuit whereby an ordinary antenna is left so as to make the adjustment easier. If the two circuits 92 and 93 are adjusted exactly for the same frequency, one of the waves passing through the antenna can oscillate through these circuits. The vibrations of the antenna produced by this wave will only act upon these plug circuits 92 and 93. The plug circuit 94 is independent of said wave and only vibrates through the other.

This second wave is the longer or the shorter one according as to whether the oscillating period of the circuit 94 is greater or smaller than the one of the wave which can oscillate in the adjusted circuits 92 and 93.

A secondary circuit 96 is coupled inductively with the antenna by means of two small coils 97 and 98 as explained hereinabove.

The circuit is adjusted as follows for working:

(1°.) The plug-circuits 92 and 93 are first adjusted for the wave-length of the wave to be received. This can be done methodically by using the switch 95. Latter is first open and the antenna is adjusted in the usual manner for the wave to be received. The switch 95 is then closed and the plug circuit 93 is adjusted without touching any more 92;

(2°.) The antenna is then adjusted with the stray wave by adjusting the circuit 94, without touching 92 nor 93, the two adjustments having no influence one on the other.

It is preferable that the plug circuit 94 should be similar to the two others so that by making its capacity vary above and below its mean value, the second wave-length with which the antenna is tuned is longer or shorter than the working wave-length, whereby the stray wave can be eliminated by the plug circuit 94 in all cases;

(3°.) The secondary circuit 96 is adjusted for the working wave and the couplings of the coils 97 and 98 are disposed so as to annul completely the currents induced by the stray wave (this is provided for by making use of the change in the direction of flow of the currents in the circuits 92 and 93 according as to whether the antenna vibrates with one or the other wave). Thus the two waves can be completely separated, even if their wave-lengths are very near. However if the strays are very powerful and it is difficult to find a complete extinction thereof, they can be choked without choking the useful wave. In view of this it is sufficient to provide the plug 94 with a shunted resistance 90 or with any other damping arrangement. This damping has no effect on the working wave as no current produced by said wave passes any more through the plug circuit 94. On the contrary this damping chokes the stray wave entirely. This arrangement protects very simply and very efficiently against strays, and is also easier to set up than the usual connections.

The advantages are the following:

(1°.) The two adjustments do not interfere at all and a stray wave can be completely eliminated whatever its wavelength is without the tuning to the working wave needed to be corrected.

(2°.) The separation of the two waves and the elimination of the stray wave can be complete;

(3°.) The antenna circuit can be damped for the stray wave without the working wave being choked.

(C.) The preceding method allows an easy and simple protection against one stray wave to which one of the circuits, is tuned; the third method described hereinbelow does away with this tuning. It consists in transmitting by two waves of very near frequencies, the emissions on the two waves being alternated at a frequency F (which can be suprasonorous in the case of radiotelephony). The receiver comprises two detecting tubes each actuated by one of the waves and inserted so as to send current in opposite directions towards one same receiver or amplifier. If a stray wave is emitted at a frequency near that of one of the waves, it will make the antenna vibrate on both its waves separately and as the tubes are inserted in opposition one to each other the action of the stray wave on the receiver will be the difference between its action on both lamps. The receiver will be thus very slightly influenced. On the contrary the alternating waves emitted by the emitting station act one after the other but with full efficiency on the receiver which will be very strongly influenced.

Fig. 4 shows an arrangement of this type.

The oscillating circuits 29 and 30 of the antenna are coupled with the coils 25 and 26 on one hand and 27 and 28 on the other as explained hereinabove. Each of these groups of coils 27—28 and 25—26 is inserted in the grid circuit of one of the detecting tubes 31 and 32. The plate circuits comprising or not coils such as 33 and 34 for regeneration are connected with the primary windings 35, 36 of a transformer. These windings are wound in opposite directions and provided with shunted condensers 37 and 38 through which high-frequency currents can pass; the secondary 39 of the transformer is connected with the amplifier 40 and can be provided with an adjustable shunted condenser.

The working of the device is easy to understand. If a stray wave is emitted, its length will be generally near enough that of the working waves to act simultaneously on both tubes 31 and 32; these detect the wave as usual but the currents passing through the coils 35 and 36 of the transformer will be opposed and the current induced in the secondary will depend solely on the difference of the currents produced in the two tubes by the stray wave.

In the case of the working waves, on the contrary which alternate at the frequency F, the first wave is received by the circuit of the tube 31 and by reason of the tuning will have no effect on the tube 32. The tube 31 detects this wave and the current flowing through the winding 35 will vary and consequently induce in the winding 39 and the amplifier 40 a current having a certain direction. When the second wave succeeds to the first one the same phenomena begin over again but through the tube 32 and the winding 36. The coils 35 and 36 being wound in opposite directions, the current induced in the secondary 39 will have a direction opposite to that of the current previously induced, consequently an alternating current of frequency F will flow through the coil 39 and its intensity will depend on the effect each wave produces separately.

The amplifier 40 and the transformer will be calculated for this frequency F; the transformer circuit can for instance be tuned to this frequency by means of the adjustable condenser 41. It can comprise an iron core if the frequency F is small and if it is great a simple oscillating circuit coupled with two coils inserted in opposition like the coils 35 and 36.

In the case of secret wireless telegraphy the emitting station is of any of the two wave types described hereinabove, whether these produce widely different wave lengths or not. The waves are modulated at a musical or at an ultrasonorous frequency which is the same for both waves.

The two emissions can be simultaneous or alternating by means of a key which can change the phase of the modulation for one of the waves so that according to the position of the said key, modulations of the two waves will be in step or in opposition.

The connections should be such for instance as to cause the modulations to be in step (simultaneous emissions) when the key is raised and in opposition (alternating emissions) when it is lowered.

The receiver comprises:

(1°.) A double wave receiving circuit adjusted on the two wave lengths used for the transmission;

(2°.) Selecting circuits adjusted for one wave-length only;

(3°.) Two detecting valves detecting each one of the waves and mounted in a differential manner so as to make their total action on the receiving device connected with them be completely nil or partially diminished when the two waves pass at the same time.

Thus nothing or little is heard when the key is raised as then the two waves pass both together to the receiving device. On the contrary when the key is lowered, the waves alternate and both actuate the receiving device.

Nothing will be heard therefore unless the key is lowered when the emitting station will be heard.

But a spying station using a receiver adjustable to only one wave-length and adjusted to receive one of the two waves emitted will receive without any interruption whether the key be raised or lowered. The working of said key only produces a change in the phase of the modulation of the wave receiver and cannot be detected. The spy has therefore the impression of a continuous emission.

The modulation can be of any suitable frequency which can be a musical one (1000 periods per second for instance) on which case no further detection is required for hearing. The frequency could also be suprasonorous in which case it is necessary to modulate the modulations of the wave either when emitting or when receiving. These second modulations are detected again so as to allow hearing.

The emission can be made by any of the abovedescribed emitting devices. The changing of phase can be made by one of the following methods.

(A.) The primary modulation being produced by a ticker or by a rotating switch the changing of phase is operated by changing through the key the connection of the contacts connected to the grid circuits.

Figure 42:
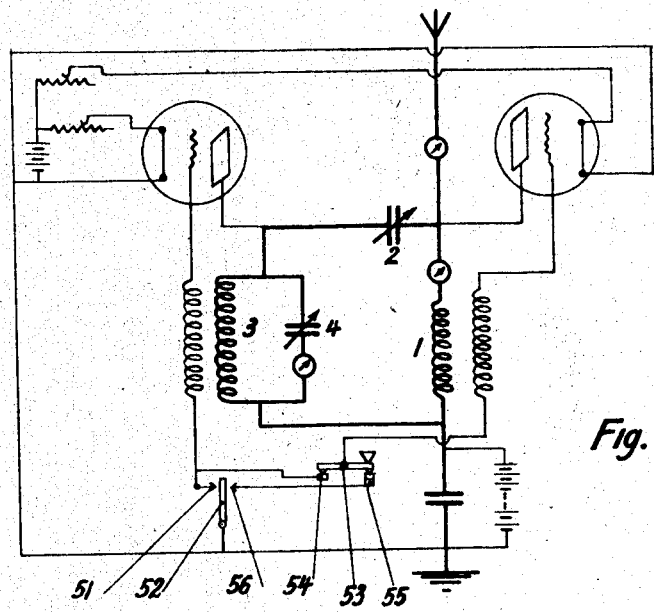

Figure 42 shows an emitting station of this type.

The oscillating double-wave circuit comprises a coil 1, a capacity 2 and a plug circuit constituted by the coil 1 is grounded and the other is connected to the antenna. The plates of the two vacuum tubes producing the waves are connected each to one of the terminals of the capacity 2. The grids of the two lamps are each connected with a winding coupled with one of the coils 1 or 3. One of these windings is connected with the contact part 51 of a ticker 52 connected with the filaments of the tubes. The second winding is connected with a key 53 which connects it either when the device is not working with a terminal 54 connected with the other winding or else when it is working with a terminal 55 connected with the other contact part 56 of the ticker 52. Latter is shown diagrammatically as a blade suitably kept vibrating by means not shown on the drawing. This blade 52 comes alternately in contact with the contact parts 51 and 56. Of course this blade can be replaced by any other suitable device such as a rotating switch for instance. When the key is at its rest position against the terminal 54, both waves are emitted simultaneously each time the ticker 52 comes into contact with either contact part 51 or 56.

(B.) If the modulation is operated by feeding the plates with A. C., the changing of phase can be made by reversing through a suitable switch the direction of the winding of a coil of one of the feeding transformers. To help this switching the opening of the circuit is preferably made in oil or an intermediary circuit of low voltage.

Figure 43:
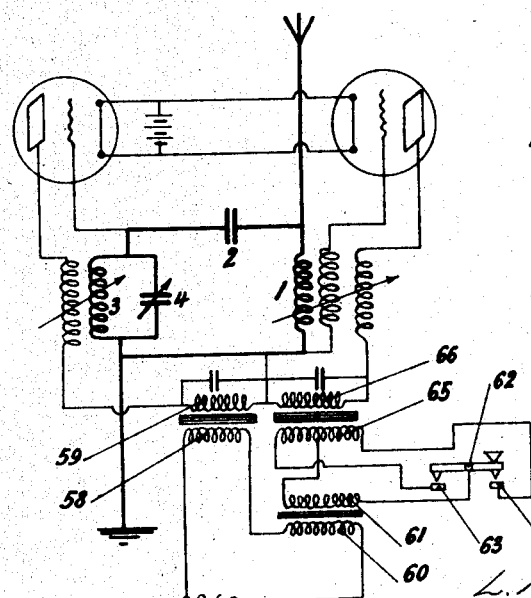

Figure 43 shows an emitting device of this type wherein a low tension intermediary circuit is opened and shut for operating. The double wave oscillating circuit is similar to that of Fig. 42. The grids of the wave generating tubes are each connected to one end of one of the coils 1 or 3. The A. C. supply 57 feeds in series or in parallel on one hand the primary 58 of a transformer 58—59, on the other hand the primary 60 of another transformer 60, 61. The secondary winding 61 of latter transformer is connected to a hand lever having two contact parts 63—64 (a rest and a working contact part) connected with the two ends of the primary 65 of another transformer 65—66. The other end of the secondary 61 is connected with the middle of said primary 65. The two windings 59, 66 provided with shunted condensers are inserted between the plates of the two lamps. According as the coil 65 is fed through the contact 63 or the contact 64 the two waves produced in the antenna by the windings 59 and 66 will be in step or in opposition.

The receiver corresponding to either above described emitters is of the type shown Fig. 41; the antenna can be of the type receiving two wave lengths very far apart as well as of the type receiving two wave lengths very near each other as shown on Fig. 41.

In the case of wireless secret telephony, the emission can be cut up and sent alternately on one of the working waves. A two-wave receiver is used which records the two waves with the same intensity so as to reconstitute the emission. A spying station on the contrary will only hear on either wave unintelligible or cut-up words.

The emitting station is of any of the above described types emitting alternately two waves.

The waves are cut either by feeding the plates with A. C. in phase opposition for the two waves or else by means of a ticker or of a rotating switch.

The telephonic modulation is produced by any of the known methods.

If the emitting station uses as in Fig. 35 only one tube the modulating device is any of the usual devices used for that purpose.

Fig. 44 shows an emitting station of this type. The rotating switch 70 connects alternately the grid of the vacuum tube 71 with one of the two coils 14, 15 inserted in the circuit in opposite directions. These coils coupled with the coil 5 of a compound circuit comprising two plug circuits 5—16 compel alternately the antenna to produce the corresponding wave. The voltage of the grid of the tube 71 is modulated by the vacuum tube 73 filament and plate of which are connected through the condenser 74 of the tube 71. Its grid potential is modulated by the circuit 75 wherein is inserted the microphone 76 of the telephonic apparatus.

The connections as drawn on Fig. 44 show the drawback of producing by the modulation of the grid circuit through the tube 73 some distortion of the words spoken and some unsteadiness of the working.

This is avoided by using the connections of Fig. 45. The modulating tube 73′ grid potential of which is modulated by the microphone 76 through the transformer 75 acts on the voltage of the plate of the wave-generating lamp 71 through the following connections: the plate of the modulating tube is fed in parallel by the same supply as the plate of the emitting tube. In the common circuit is inserted a coil 91 having a great impedance for these telephonic frequencies and adapted to keep the current fed by the supply substantially constant. Thus the modulations of the plate current in the emitting tube are equal and opposed to those of the plate current in the modulating tube, whereby the waves transmitted are suitably modulated.

The coil 91 is provided with a small shunted capacity 90 through which the high frequency currents can pass without the impedance of the circuit being diminished for currents at telephonic frequencies.

When the emitting station comprises two tubes (or sets of tubes) the modulating device should be such as will modulate the two sets of tubes, the connections providing for the identity of the modulations in each of them.

Fig. 46 shows a station of this type connections of which are similar to those of Fig. 36. The rotating switch 80 is disposed between the two grid circuits of the tubes 81—82 on one hand and the condenser 83 on the other. The terminals of said condenser are connected to the filament and the plate of a vacuum tube 84 grid of which is modulated through the transformer 85 primary of which comprises the microphone 86. The vacuum tube 84 modulates alternately the currents passing in the grid circuits of the oscillating tubes 81—82. The two-wave compound circuit 1—3 connected with the antenna vibrates alternately with one or the other wave without this changing affecting the modulation which is borne in the same manner by either wave emitted.

When the plates are fed with A. C. in view of cutting the emitting waves periodically, a buzzing is heard in the receiver which is caused by the sinusoidal modulation produced by the A. C. This buzzing is not heard on the contrary when the cutting of the waves is produced by a ticker or a rotating switch whereby the waves show a square modulation.

However these connections may be difficult to execute as they require both wave emissions to be cut.

A much more practical device can be made up by:

(1°.) Emitting continuously and simultaneously two waves;

(2°.) These waves are alternately modulated by the microphone circuit, the alternations following any rythm desired and the words are carried alternately by either wave.

Figure 47:
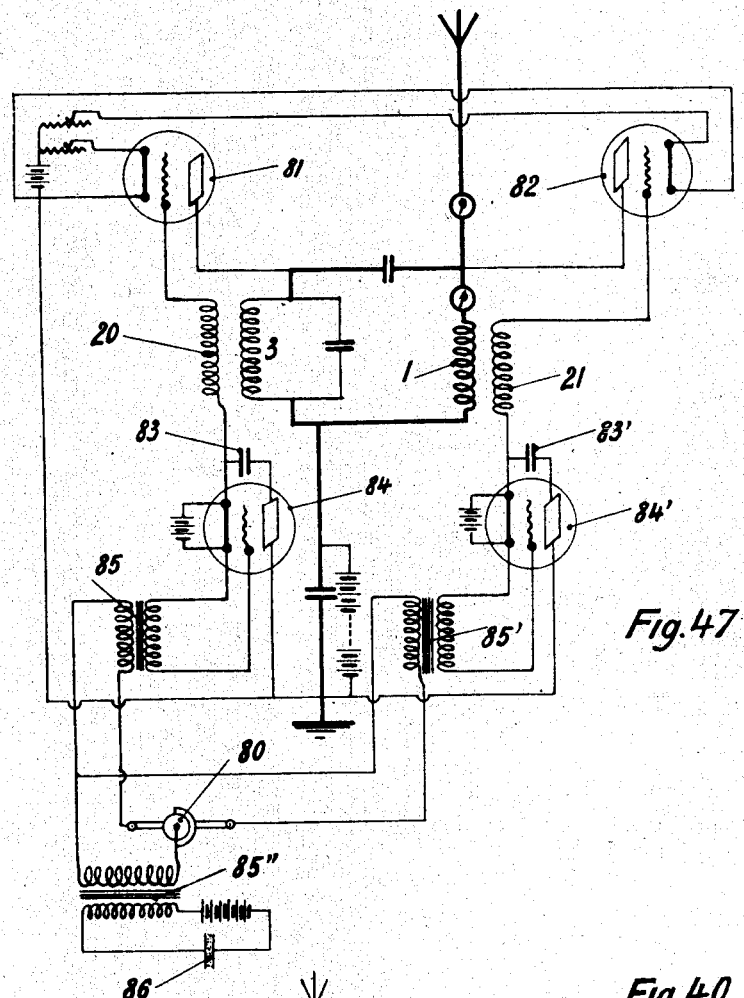

The required secret transmission is thus established without any cutting of the waves. Fig. 47 shows such an emitting station of this type. The two waves are produced separately and simultaneously by the tubes 81 and 82 which make the double wave antenna vibrate as explained with reference to Fig. 36.

The grid circuits of both tubes comprises a telephonic modulating device constituted by a capacity 83 and 83′ provided with a shunted vacuum tube working in a manner similar to that of tube 84 of Fig. 46. The grids of these modulating vacuum tubes are fed with telephonic currents through the transformers 85 and 85′. The primary coils of these transformers are connected in parallel with the terminals of the secondary of a telephonic transformer 85″ and alternately inserted in its circuit by means of the rotating switch 80. The primary of the transformer 85″ comprises a supply of D. C. and the microphone 86.

The station works in the following manner:

The two waves are emitted simultaneously and continually; each of them is modulated by the microphonic currents when the corresponding transformer 85 or 85′ is inserted in the circuit through the rotating switch 80 and non-modulated when such is not the case.

If the switch 80 is built in such manner that there is always one and one only transformer inserted in circuit at the same time, there is only one modulated wave, the other being then non-modulated and the modulation passing from one wave to the other at the rythm given by the switch.

A spy adjusted on one of the waves would hear only during the periods when the said wave is modulated so that he would only receive fragmentary and unintelligible sounds as explained hereinabove with reference to the preceding diagrams of connections.

On the contrary a receiver which is adjusted for receiving both waves with the same intensity allows an interrupted hearing of the sounds which are thus built up again.

This arrangement shows the great advantage for practical purposes that there is no opening of circuits under high potential or fed by strong D. C.

The only opening of a circuit is that made on the connecting circuit between the transformer 85″ and the transformers 85 and 85′ wherethrough only a weak A. C. flows.

It also solves the problem in the best manner possible inasmuch as it eliminates the periods of increase and decrease of each wave whereby the reception is purer.

The corresponding receiver comprises:
(1°.) A two-wave collector;
(2°.) Two selecting circuits each of which is adjusted to receive one of the waves;
(3°.) Two detecting lamps acting in parallel on a telephonic amplifier.

This receiver can be of the type shown on Fig. 41 and adapted for receiving a modulation of telephonic frequency. The only difference would be that one of the windings 35 or 36 in the coupling 35, 36, 39 should be reversed so as to make the two detecting tubes work in parallel and not in opposition.

The couplings between the two selecting circuits through the coils 25, 26, 27 and 28 with the antenna should be adjustable so as to afford means for making equal the intensity of the received currents produced through both waves whereby undulating sounds are prevented; according to the case required the antenna will be of the type receiving waves having wave-lengths greatly differing or not. Only one detecting tube may be used if the grid circuit of said tube is connected with a part of the antenna circuit or of a secondary two-wave circuit between the extremities of which the voltage of the current produced by both waves is great (such as the plug circuit 29 for instance of the antenna circuit of Fig. 41). Other antenna circuits can be used with their two secondary plug circuits inserted in series in the grid circuit of the detecting lamp. The diagrams can be easily drawn without any further details being given.

*Compound circuits used for electric communications by wire.*

All the connections described hereinabove for radio-communication can be used for high frequency telegraphic or telephonic transmissions by wire. More particularly the double-wave circuits solve very well the problem of a bilateral communication by wire with currents of two different frequencies.

The method of coupling a double-wave antenna with secondary circuits as described hereinbefore can be applied to the coupling of any double-wave circuit with any secondary circuit and affords the means for separating completely two currents of different frequencies. These double-wave devices replace with advantage the known selecting devices used for the same purpose as it is easier to set up the corresponding connections and it selects the desired frequency without weakening it.

Lastly the two-wave circuits allow secret communications to be transmitted by wire as well as by radio either by telegraph or telephone. Similarly the communications can be protected against accidental or purposely made confusion.

By suitably combining these two forms of execution (unconfusable reception and undecipherable emission) a perfectly secret transmission can be provided for; that is a spying station cannot decipher it if it has not got the key and on the other hand it is impossible to confuse it.

The coupling of such double-wave devices with the line wire is effected as in the case of ordinary circuits.

The coupling can be an inductive electrostatic one if a simple connection is used and the antenna is replaced by a condenser transmitting the oscillations from the circuits (as in the case of radio-communication the condenser must be connected with the circuit at a point where the voltage corresponding to both waves is high). The coupling can also be an inductive electromagnetic one if a double line wire is used; in this case a coil is inserted in the circuit at a point where the voltage corresponding to both waves is high. The coil could also be inserted in the plate circuit of a relay vacuum tube grid of which is inserted in a two-wave circuit in a manner similar to that of the condenser described with reference to the first way of coupling.

Lastly two coils could be inserted in the line wire, each of these being coupled with the coils of the compound circuit wherein the two waves vibrate.

What we claim is:

1. In arrangement for radiocommunication a compound circuit comprising a number of distinct plug circuits tuned to different wavelengths whereby the waves pass through the compound circuit in a given direction according to which plug circuit is tuned to them, and secondary circuits coupled with the plug circuits and tuned each to one of the said plug circuits, the direction of the windings in the couplings being determined so as to provide the addition of the effects produced by one of the waves and the substantial cancellation of the effects produced by the others, the aerial being moreover connected with the compound circuit at those points where the potentials due to the different waves are the most different.

2. An arrangement for radiocommunication comprising a transmitting set consisting in a compound circuit as described in claim 1 and provided with emitting means, each secondary circuit being provided with independent means for modulation and a receiving set consisting in a compound circuit as described in claim 1 and provided with receiving means, the corresponding plug circuits in both emitting and transmitting circuits being tuned to the same wavelength.

3. An arrangement for radiocommunication comprising a transmitting set consisting in a compound circuit as described in claim 1, and provided with emitting means, each of the two secondary circuits being provided with independent means for modulation, an arrangement common to both secondary circuits being provided for modulating them out of phase one with reference to the other, and a receiving set consisting in a compound circuit as described in claim 1 and provided with receiving means, means being provided for connecting at will both secondary circuits to the same or to different receiving devices, the corresponding plug circuits in both emitting and transmitting circuits being tuned to the same wavelength.

4. An arrangement for radiocommunication comprising a transmitting set consisting in a compound circuit as claimed in claim 1 with two secondary circuits, two wavegenerating vacuum tubes, the grids of which are inserted each in the corresponding secondary circuit, keys inserted in each of said secondary circuits, means for manipulating automatically both keys when desired and a switching device adapted to close alternatingly at stated intervals both secondary circuits and a receiving set consisting in a compound circuit as claimed in claim 1 with two secondary circuits, two receiving units and a switch adapted to connect at will the secondary circuit either to the same or to different receiving units, the corresponding plug circuits in both emitting and transmitting circuits being tuned to the same wavelength.

In testimony whereof we have signed our names to this specification.

LÉON NICOLAS BRILLOUIN.
EMILE MARIE FRANÇOIS FROMY.